H. CHESHER.
NUT LOCK.
APPLICATION FILED NOV. 5, 1912.
1,082,735.
Patented Dec. 30, 1913.
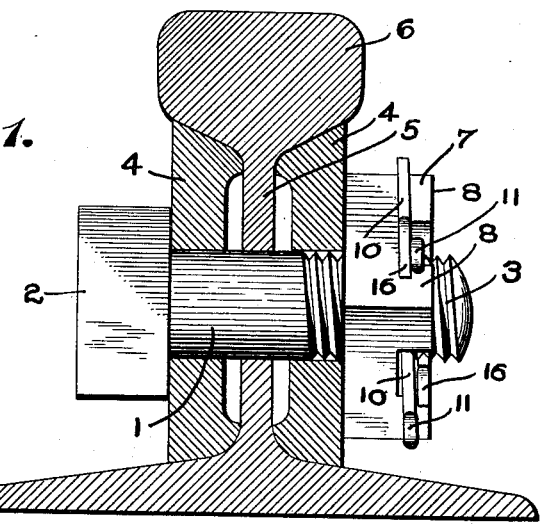
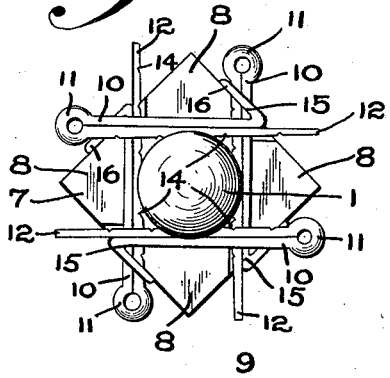
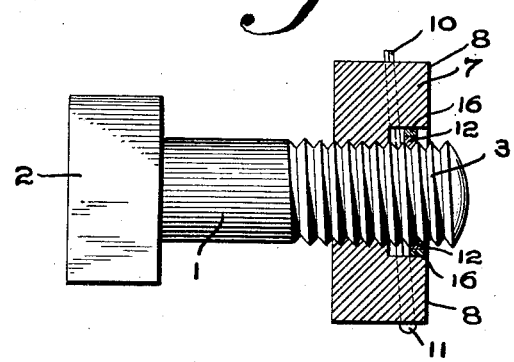
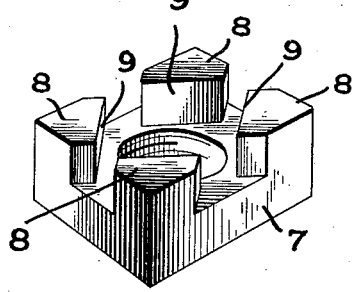
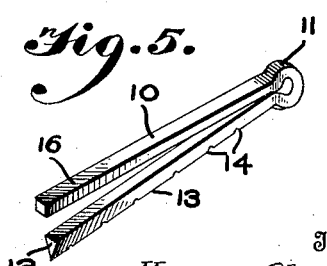
Witnesses
Inventor
Harry Chesher.
By Joshua R. H. Potts
Attorney
COLUMBIA PLANOGRAPH CO., WASHINGTON, D. C.

UNITED STATES PATENT OFFICE.

HARRY CHESHER, OF PHILADELPHIA, PENNSYLVANIA.

NUT-LOCK.

1,082,735.  Specification of Letters Patent.  Patented Dec. 30, 1913.

Application filed November 5, 1912. Serial No. 729,589.

*To all whom it may concern:*

Be it known that I, HARRY CHESHER, a citizen of the United States, residing at Philadelphia, in the county of Philadelphia and State of Pennsylvania, have invented certain new and useful Improvements in Nut-Locks, of which the following is a specification.

My invention relates to improvements in nut locks, the object of the invention being to provide an improved construction of nut and an improved locking device of spring metal comprising two members when together constituting a wedge, and which is adapted to lock between the threads of the bolt and be secured against turning movement when one member is bent against the outer face of the nut.

A further object is to provide an improved construction of nut and locking device which enables a plurality of these lock devices to be positioned across each other.

A further object is to improve upon the construction of wedge holding nut lock disclosed in my pending application filed October 21, 1912, and given Serial No. 726,858.

With these and other objects in view, the invention consists in certain novel features of construction and combinations and arrangements of parts as will be more fully hereinafter described and pointed out in the claims.

In the accompanying drawings: Figure 1 is a view in section illustrating my improvements in connection with a rail joint. Fig. 2 is an end elevation of the nut and its locking means. Fig. 3 is a view in elevation of the bolt showing the nut and its locking means in section. Fig. 4 is a perspective view of the nut, and Fig. 5 is a perspective view of one of the locking devices.

1 represents a bolt having a head 2 at one end and screw-threaded at its other end as indicated at 3. The bolt is shown projected through alined openings in fish plates 4, and the web 5 of rail 6 and my improved nut 7 is screwed onto the bolt against one of the fish plates. The nut 7 on its outer face is recessed so that four lugs 8 are provided which have straight inner walls 9 located in a plane appreciably outside of the plane of the end walls of the lugs and away from the opening in the nut, so that my improved locking devices 10 may be positioned between any and all of said lugs, and the ends of said devices projected beyond the outer surface of the nut as clearly shown in Fig. 2.

Each locking device 10 comprises a bar of metal which is bowed centrally between its ends forming an eye 11, and the two ends are positioned beside each other constituting two members which taper slightly to their free ends so that they constitute when together a wedge. One member 12 is triangular in cross section forming a sharp cutting edge 13 adapted to engage between the threads of the bolt, and this edge 13 is notched as shown at 14 to more effectually cut into the bolt at the base of the threads.

While of course, the entire locking device may be of elastic material, it is only necessary that member 12 be elastic or in other words, so treated as to constitute a spring, and when the device is driven into place as indicated in Fig. 2, not only does the wedging action accomplish the lock, but also exerts a certain amount of elasticity or spring which insures a binding lock regardless of shrinkage.

When the device is driven into place, the outer member 16 is bent backwardly against the outer face of the nut as indicated at 15, so that the device cannot be withdrawn until this end is again bent to its former shape. This is a further reason why only the member 12 should be treated to render it elastic because of the bending of member 16.

While I have shown four of these locking devices crossing each other, it is of course to be understood that I am not limited to any particular number, and various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a nut lock, the combination with a nut having a lug on one face, and a locking device adapted to be positioned between the said lug and the bolt, said locking device comprising a bar of metal bent between its ends forming two members, both members located between the lug and the bolt, one member having a sharp cutting edge to fit between the threads of a bolt, and the other member adapted to be bent against the outer face of the nut, substantially as described.

2. In a nut lock, the combination with a nut having a lug on one face, and a locking device adapted to be positioned between the said lug and the bolt, said locking device comprising a bar of metal bent between its ends forming two members, both members located between the lug and the bolt, one member having a sharp cutting edge to fit between the threads of a bolt, and the other member adapted to be bent against the outer face of the nut, said device of spring metal whereby the member in engagement with the bolt is held in such position by the elasticity of the device, substantially as described.

3. The combination with a screw-threaded bolt and a nut screwed thereon, of integral lugs on the outer face of the nut, said lugs having straight inner faces spaced from the bolt opening in the nut, and in a plane outside of the plane of the end of the other lugs, spring locking devices crossing each other positioned between the lugs and the bolt and engaging between the threads of the bolt, each locking device comprising a bar of metal bent between its ends and one end having a sharp cutting edge located between the threads of the bolt, substantially as described.

In testimony whereof I have signed my name to this specification in the presence of two subscribing witnesses.

HARRY CHESHER.

Witnesses:
R. H. KRENKEL,
CHAS. E. POTTS.

---

Copies of this patent may be obtained for five cents each, by addressing the "Commissioner of Patents, Washington, D. C."